United States Patent [19]

Kito et al.

[11] 4,179,980
[45] Dec. 25, 1979

[54] HYDRAULIC BRAKE BOOSTER

[75] Inventors: Masahiro Kito, Nagoyashi; Yoshiharu Adachi, Gamagorishi, both of Japan

[73] Assignee: Aisin Seiki Kabushiki Kaisha, Kariya, Japan

[21] Appl. No.: 782,436

[22] Filed: Mar. 29, 1977

[30] Foreign Application Priority Data

Apr. 3, 1976 [JP] Japan .................................. 51-37394
Apr. 17, 1976 [JP] Japan .................................. 51-44000

[51] Int. Cl.² ............................................. B60T 13/16
[52] U.S. Cl. ........................................ 91/6; 60/547 A; 60/548; 60/553; 91/49; 91/372; 137/625.12
[58] Field of Search ................. 60/547, 548, 552, 553, 60/554, 562, 593, 547 A; 91/370, 371, 372, 434, 6, 49; 137/625.12, 625.35

[56] References Cited

U.S. PATENT DOCUMENTS

| | | | |
|---|---|---|---|
| 2,857,743 | 10/1958 | Price | 60/554 |
| 3,638,426 | 2/1972 | Belart | 60/548 |
| 3,786,636 | 1/1974 | Kobashi | 60/548 |
| 3,815,364 | 6/1974 | Belart | 91/372 |
| 3,922,953 | 12/1975 | Strauff | 91/434 |
| 3,967,536 | 7/1976 | Bach | 60/553 |
| 3,976,171 | 8/1976 | Belart | 60/552 |

*Primary Examiner*—Abraham Hershkovitz
*Attorney, Agent, or Firm*—Burns, Doane, Swecker & Mathis

[57] ABSTRACT

A hydraulic brake booster adapted to vehicles having a manually operable control valve to control pressure increase in the booster for attaining the available braking fluid pressure in the brake wheel cylinders of the vehicles. In the booster is employed a control device to hold off a reaction force on the pedal to actuate the booster so that a properly controlled brake feel is transmitted to the vehicle operator at an initial stage of actuation of the booster. An earlier pressure rise is attained in the wheel cylinders within an otherwise vainly consumed period of time as a timelag and accordingly a safe and reliable braking operation is performed.

4 Claims, 7 Drawing Figures

HYDRAULIC BRAKE BOOSTER

BACKGROUND OF THE INVENTION

This invention relates to a hydraulic brake booster assembly and more particularly to one having a manually operable control valve to control pressure increase in the booster for attaining the available braking pressure in the brake wheel cylinders of the vehicle.

It has been the practice in the art that means is employed in order to hold-off a reaction force to the pedal so that a proper brake feel is transmitted to the vehicle operator at an initial stage of actuation of the booster. The means may be of such type as disclosed by U.S. Pat. No. 3,699,680 in which is mounted a cylinder and reaction piston assembly together with a compressed spring to preload the assembly. This arrangement is considered to be deficient in that, the booster is structurally complicated.

SUMMARY OF THE INVENTION

The principal object of the invention is therefor to provide an improved hydraulic booster able to obtain the desired brake feel without being structurally complicated.

The foregoing object and others are attained according to at least one aspect of the invention through the provision of means to block reactional force on the pedal at the early stage of operation of the booster so that the vehicle operator may excessively actuate a control valve of the booster without being resisted by the reaction force to thereby cause earlier pressure rise in the booster within an otherwise vainly consumed period of time as a timelag.

Thus in the embodiments, there are comprised, a cylinder having a power piston movable therein and defining therewith a hydraulic fluid inlet chamber and a hydraulic fluid outlet chamber, a first fluid control means carried by the power piston for controlling pressurization of the inlet chamber and thereby controlling the pressure differential across the power piston. The fluid control means includes a manually movable input piston connected to the brake pedal and slidably received by and relative to the power piston. The booster further comprises an output member extending from the power piston through the outlet chamber and through an end wall of the cylinder to actuate a brake master cylinder upon actuating movement of the power piston. A reaction chamber is defined by a portion of the power piston and an effective cross section area of the input piston. A second fluid control means is comprised of control pressurization of the reaction chamber and formed of another portion of the power piston and a portion of the input piston.

DESCRIPTION OF PREFERRED EMBODIMENTS

Figure 1:
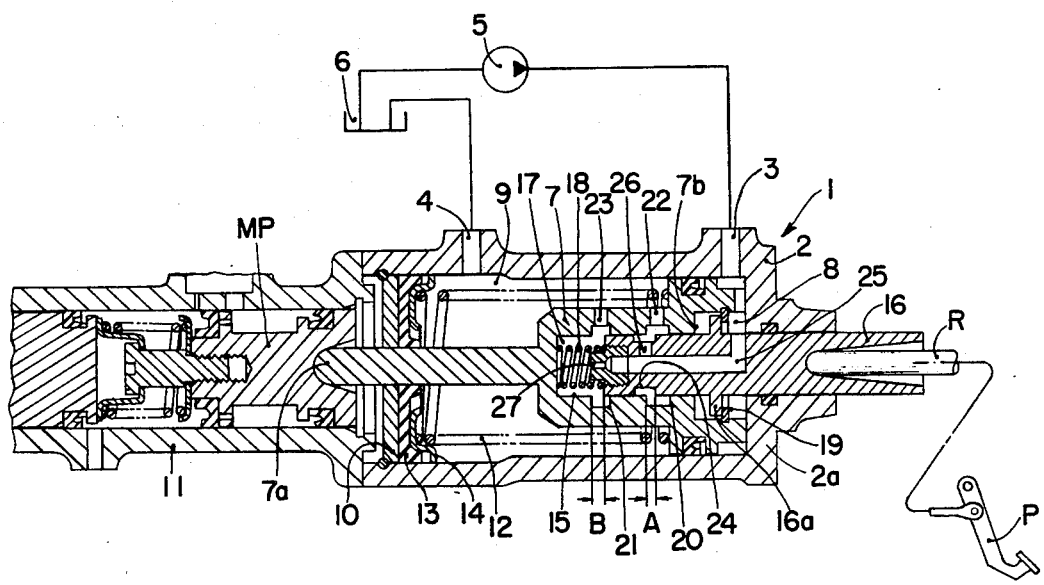
FIG. 1 is a representation of a hydraulic braking system in which a booster according to the invention is used and somewhat schematically shown, the booster being shown in axial cross section.

Referring now to FIG. 1, the pump discharging conduit connects the pump 5 with an inlet port 3 of a housing 2 of a booster 1 as shown by the solid line in FIG. 1. An outlet port 4 of the housing 2 is connected with a reservoir 6 which is connected by a suction conduit with the pump 5 as shown also by the full line in the view. Within the housing 2 is closely slidably fitted a power piston 7 having a large internal cylindrical recess or bore 15. In the cylindrical bore 15, an input piston 16 is slidably received. The input piston 16 is slidably mounted in the rearwardly extending sleeve portion formed as a part of cylinder end wall 2a. A brake pedal P is connected to the push rod R. The power piston 7 has an extension 7a projecting out of the housing 2 toward the left through a seal 13 and guiding end wall 10 to thereby connect with a master cylinder piston assembly MP in the brake master cylinder 11.

The power piston 7 defines a power chamber 8 and a drain chamber 9 which is normally in communication with the atmospheric pressure. When the booster 1 is operated for actuating the brakes of the vehicle, the flow of hydraulic fluid through the booster 1 is retarded and pressure builds up in the power chamber 8 for operating the power piston 7 of the power unit or booster 1 in a left-hand direction, in a manner explained as the discussion preceeds, so that brake operating fluid pressure is accordingly built up in the master cylinder 11 carried by the booster at its left-hand end.

The input piston 16 serves to define a reaction chamber 17 within the bore 15 of the power piston 7. The chamber 17 contains a compressed restoring spring 18 seated at the left end in the internal end wall of the chamber 17 and at the other right-hand end in the end face of the input piston 16 so that the input piston is at rest, normally spring-biased toward abutment against the ring 19 at its flange 16a. Within the drain chamber 9 is contained a larger compressed spring 12 to normally urge the power piston to the right-hand end wall 2a of the housing 2 to stop the piston in the rest position. The lef-hand end of the spring 12 is seated in the retainer 14 which in turn bears against the wall 10 across the rubber seal 13. The other end of the spring 12 is seated against the shoulder of the power piston 7.

The power piston 7 includes a bore 15. Formed within the internal face of the bore 15 are a pair of separated annular recesses or grooves 21 and 20 both connected to the external drain chamber 9 by drilled passages 23 and 22 respectively. The input piston 16 has one annular groove 24 in the external face which is connected by a drilled passage 26 to an internal right angle bent axial bore 25. The bore 25 is in communication at its right-hand end with the power chamber 8 and at the other end is in communication with the reaction chamber 17 across a small bleed orifice 27 passing through the end wall of the bore 25 so as to permit flow of fluid through the input piston from chamber 8 to the drain chamber 9 through the reaction chamber 17.

When the booster 1 is at rest, all the parts occupy the positions shown and the pump flow passes the booster without being pressurized from the inlet port 3 to the outlet 4. Passage of fluid occurs through the chamber 8, bent bore 25, radial drilled passage 26, annular groove 24, internal annular groove 20, drilled radial passage 22 and drain chamber 9. This flow is normally not pressurized until the booster function is required and the brake is actuated, causing the valve in the booster to restrict pump flow and thereby increase the pressure in the booster. The pump flow through the orifice 27 to the drain chamber 9 may be ignored in this position because of substantially little quantity of flow. The power piston 7 therefore is held in the rest position shown, since no pressure differential is produced between the opposite sides of the power piston.

When the brake booster is to be operated, the vehicle operator depresses pedal P, moving input piston 16 forwardly against spring 18 to close the opening A formed by grooves 20 and 24. The pump flow therefore is caused to pass through the bleed orifice 27 and opening B formed by groove 21 and the end of piston 16 into the drain chamber 9 and to exert a pressure differential across power piston 8. Although the opening B is also reduced simultaneously with the closing of the opening A, this does not affect in this stage the unloading character of the pump flow through the opening B because of an installed sufficient size of the opening. The higher pressure created in the power chamber 8 overcomes the force of restoring spring 12 and moves the power piston forwardly. This power piston also moves push rod 7a forwardly to actuate the mastercylinder 11, which in turn actuates the brake wheel cylinders. It should be noted that in this stage, there exists no reactional force against the input piston 16 since the reaction pressure chamber 17 within which the acting face of the piston 16 is exposed is in communication with the drain chamber 9, namely atmospheric pressure through the unloading opening B. Further it should be noted that no brake feed is transmitted to the vehicle operator in this stage and accordingly an excessive pedal effort is apt to be applied to the pedal, causing the piston 16 to be moved promptly forwardly to immediately close the opening A. This causes fluid pressure to be built up urgently without a timelag within the chamber 8 and is effective to provide better brake actuation at an early stage of operation of the booster.

In the subsequent stage or second stage, the opening B is actually or substantially restricted upon continuing movement of the piston 16 to the left to cause a pressure difference across the opening B. A reactional force is created by the fluid pressure differential across the opening B and exerted on the input piston 16 so that brake feel is transmitted to the vehicle operator through brake pedal P. The actuation of the booster is thereafter controlled by the operator in proportion of the brake feel, namely the reactional force.

Figure 5:
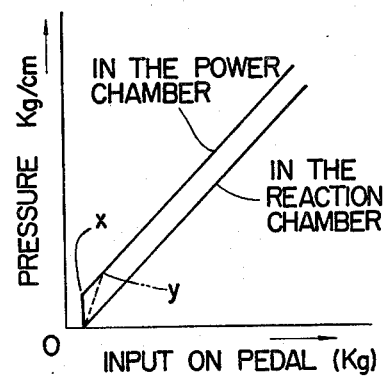
FIG. 5 is a graphical representation showing relationship between an input force applied to the pedal and the resultant reaction pressure and power pressure within the booster.
Figure 6:
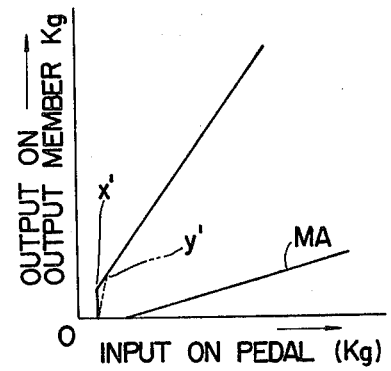
FIG. 6 is a graphical representation showing relationship between the input force upon the brake pedal and an output force of the booster.

The graphical representation of FIG. 5 is effective to completely understand the relationship between force applied to the pedal by the operator and the resultant fluid pressures built within the power chamber 8 and the reaction chamber 17. As will be seen in FIG. 5, the fluid pressure in chamber 8 is higher than that in chamber 17 in the second stage. In other words the orifice provides means for interpreting the power pressure in chamber 8 into a reactional force suitably regulated for providing better brake feel to the operator. Relationship between the input force exerted on brake pedal by the operator and the output force derived from the booster is represented in FIG. 6. From the graphs in FIGS. 5 and 6, it will be explained that available pressure rise is attained by the booster within otherwise timelaged period of time, particularly from the portion X and X' in FIGS. 5 and 6 in comparison with the line MA which represents a relationship between the force applied to the pedal by the operator and the output derived from the booster but by actuating the known manual safety device without being assisted by the powered pressure in the booster.

Figure 1A:
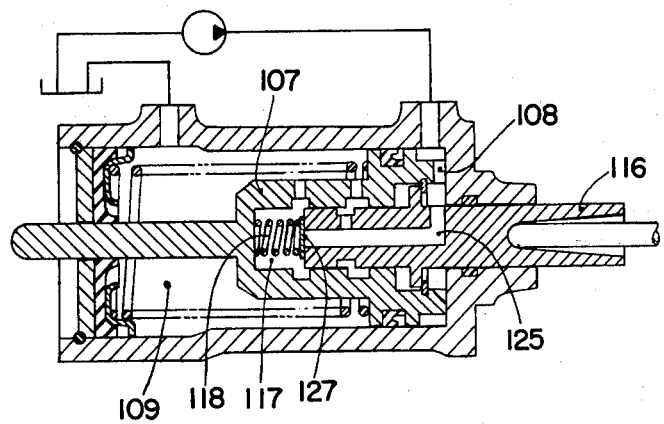
FIG. 1a shows a modification of the booster of FIG. 1.

In FIG. 1a is shown another embodiment of the booster of FIG. 1. Similar parts are represented in FIG. 1a by the same numerals in 100 series as those of FIG. 1 so that duplicated description will be abbreviated for understanding the embodiment. In this embodiment, a valve 127 known as the pressure decreasing valve is substituted for the bleed orifice 27 of FIG. 1. In this embodiment, the compressed spring 118 is employed for the purpose of urging both of piston 116 and valve 127.

Figure 2:
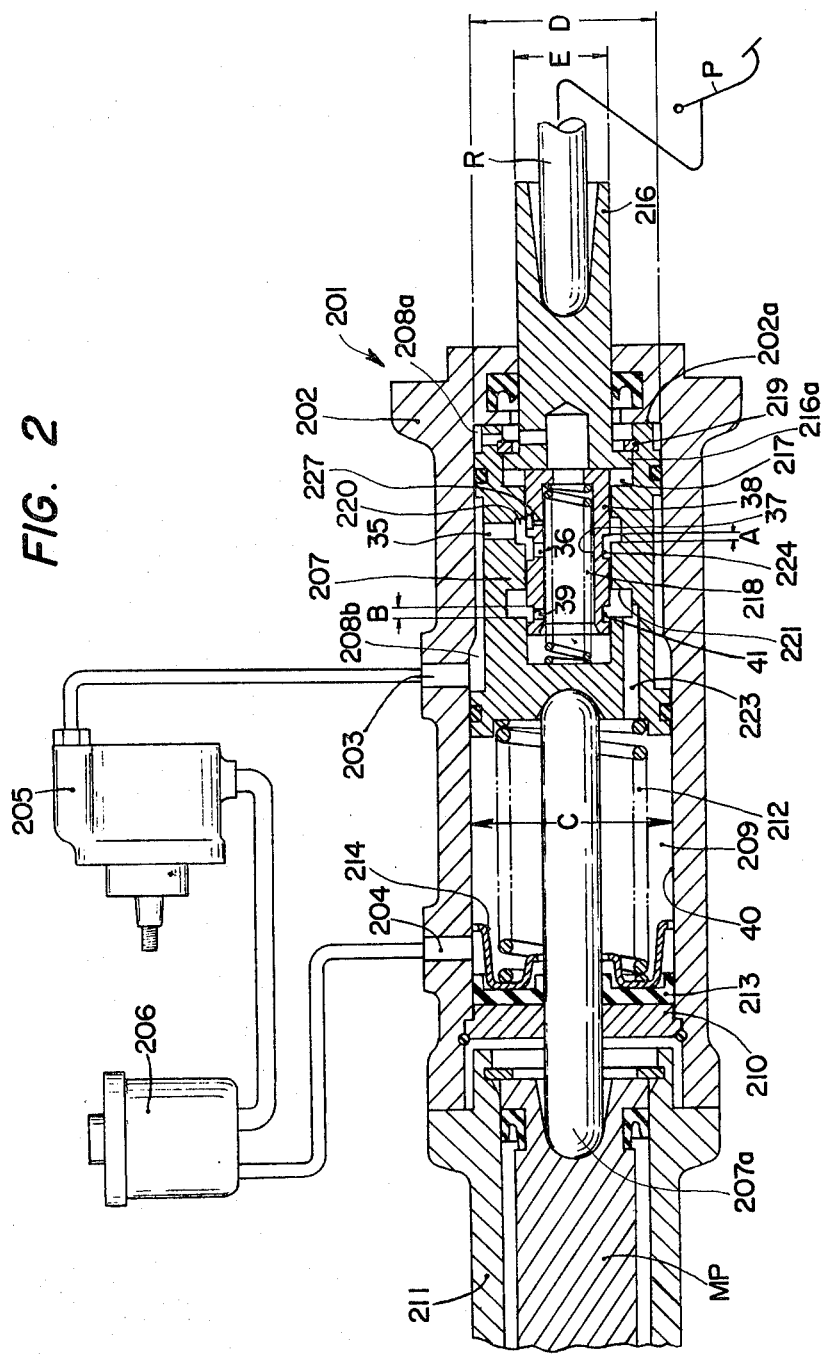
FIG. 2 is a cross section view of a modification of the booster of FIG. 1.

In FIG. 2 is shown a third embodiment of the invention. Parts similar to those in FIG. 1 are represented by the same numerals in 200 series and the other parts which have no corresponding part in the first embodiment in FIG. 1 are represented by numerals of double figures.

In the position shown, the booster 201 is at rest and all the parts occupy their rest positions.

The pump flow from the pump 205 enters into the booster through an inlet port 203. The pump flow further passes through the circuit containing a wide groove 208b in the external face of the power piston 207, a drilled passage 35, opening A formed by the annular grooves 220 and 224, a drilled passage 36, a cylindrical recess 37 of the sleeve 38, a drilled passage 39, annular internal groove 221, and axial passage 223, into the drain chamber 209. The fluid circuit does not restrict the pump flow in the position shown so that the flow is not pressurized. Any pressure difference therefore does not exist across the power piston 207 and the same is kept at rest as shown.

When the brake booster 201 is to be operated, the vehicle operator depresses pedal P, moving input member 216 forwardly to close the opening A formed by the two grooves 220 and 224. The pump flow is therefore caused to pass through the bleed orifice 227 and restricted, causing the pressure in the chamber 208b to increase. As will be seen in FIG. 2, the cylindrical bore 40 of the housing 202 is a stepped bore such that the drain chamber 209 is diametrically larger than the power chamber 208a as will be seen by comparing the diameter C of the chamber 209 with the diameter D of the chamber 208a. The pressure built up in the annular chamber 208b therefore drives the power piston 207 to the left. It should be also noted that the input piston 216 does not receive in such stage any reactional force since the acting area E of the input piston exposed in the chamber 208a and the chamber is in communication with atmospheric pressure through chamber 217, bore 37, radial drilled passage 39, annular groove 41 and 221, and passage 223 to the drain chamber 209. This is also effective to cause the driver to move the input piston 216 excessively to thereby build up a comparatively higher level pressure differential across the piston 207 within an otherwise vainly consumed timelaged period.

The timelag of the braking force is therefore avoided at the early stage in the braking operation.

When the input piston 216 is further moved to the left, the other opening B is gradually decreased to thereby increase resistance to the pump flow therethrough. This causes a pressure build up in each of the chambers 208a, 217 and bore 37. A larger pressure differential therefore is created across the power piston is this stage. The reactional force is exerted on the piston 216 by the pressure within chamber 217 acting on the area E, so that the driver can actuate the booster in proportion to the required braking force.

Figure 3:
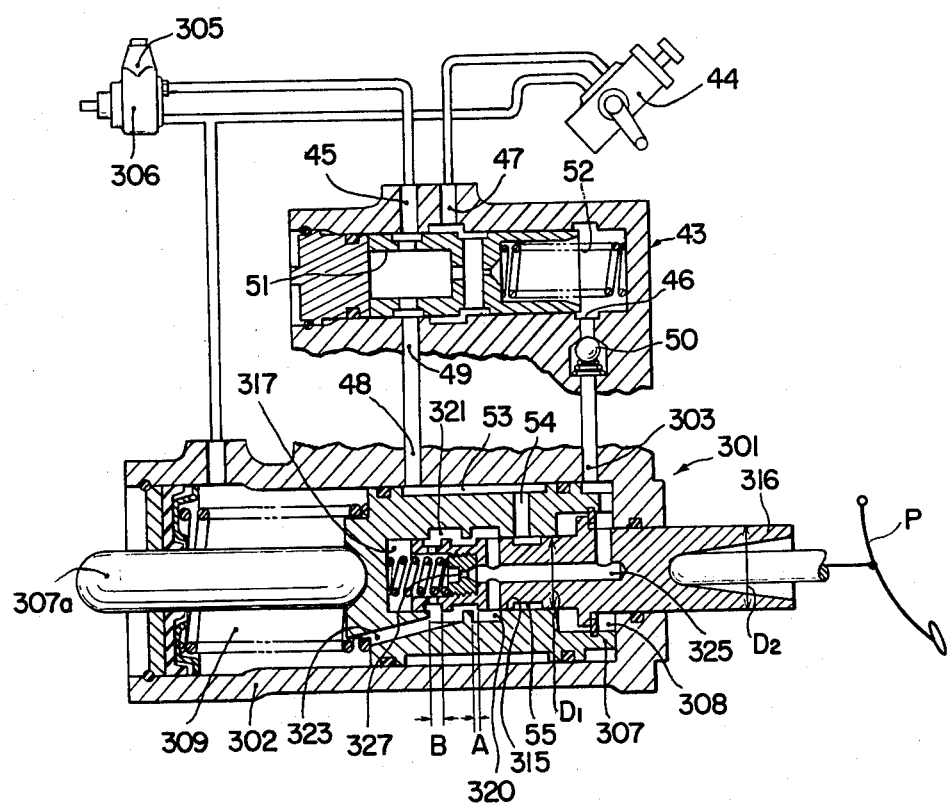
FIG. 3 is a representation of a vehicle power steering and braking system in which is used another embodiment of the present invention in axial cross section.

In FIG. 3 is shown a further different embodiment of the invention. Parts similar to those shown in FIG. 1 are represented by the same numerals in 300 series and the other parts having no similar part in FIG. 1 are represented by numerals of double figures. In FIG. 3, a hydraulic system in which the booster assembly embodying the invention is installed is illustrated as including the known flow divider 43 and power steering mechanism 44 in fluid communication with the booster by the conduit shown schematically. The flow divider 43 divides the pump flow entering the inlet port 45 into a small regulated portion and the other major portion. The regulated portion is discharged from the outlet port 46 while the major portion is discharged through the other outlet port 47 to the power steering mechanism 44. The booster 301 has another inlet port 48 which is in communication with the pump inlet 45 of the flow divider through outlet 49 of the same. The inlet port 303 of the booster 301 is in communication via a check valve 50 with the outlet port 46. The flow divider 43 has a sleeve or control piston 51 and a restoring spring 52 for performing the known dividing operation which is so conventional that further description is considered to be abbreviated.

The embodiment in FIG. 3 is illustrated as having a principal difference based upon an annular wide groove 53 of the power piston which is normally in communication with the pump inlet 45 of the divider 43 while on the other hand in communication via a radial drilled passage 54 with the axial cylindrical bore 315 of the power piston 307.

The purpose of the provision of the groove 53 is that an unusually sudden depression of the braking pedal P causing an earlier building up of the fluid pressure is achieved in the power chamber 308 than is obtained by function of the orifice 327 as hereinbelow described in greater detail.

When the pedal is suddenly depressed extremely, the input piston 316 is excessively promptly moved to the left until its left end extremity abuts against the internal end of the bore 315, without permitting sufficient time for the orifice 327 and the opening B to perform their operation. In such position, the openings A and B are both closed and the annular grooves 55 and 320 becomes communicated. The pump flow entering the inlet 48 accordingly passes thereafter through the drilled radial passage 54, annular grooves 55 and 320, bent passage 325 into the power chamber 308. The power piston is as a result, moved urgently to the left without being in timelag relationship with the input piston.

From the foregoing, it will be understood that the embodiment in FIG. 3 provides comparatively better means to avoid or eliminate the timelag in exerting the required braking fluid pressure within the brake wheel cylinders of the vehicle.

As will be seen, by the reference characters D1 and D2 showing different length diameters, the input piston 316 is diametrically stepped. This causes a little reaction force on the input piston 316 by the pressure in the chamber 308 acting on the area represented by a difference between the lengths D1 and D2. Such a little reactional force causes a difference in the graph as represented by the dotted line Y in the graphical representation of FIG. 5 and the same in FIG. 6 by the reference character Y'.

Operation other than that described as above is completely in accord with that of the first embodiment so that further description is considered to be abbreviated.

Figure 4:
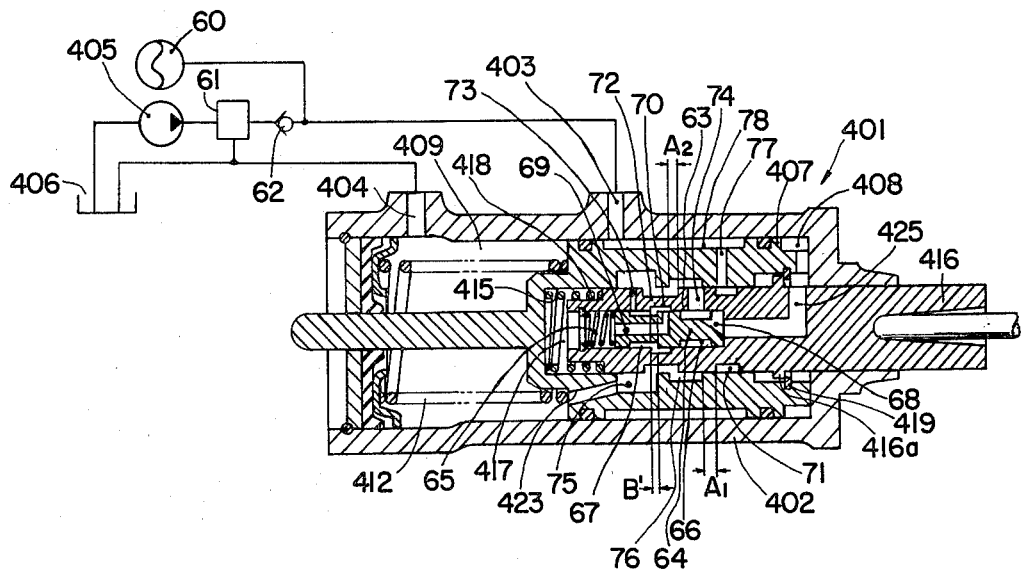
FIG. 4 is a representation of a vehicle braking system in which is used still another embodiment of closed-center type of the invention.

In FIG. 4 is shown the fourth embodiment of the invention. Similar parts to those in FIG. 1 are represented by the same numerals in 400 series and the other parts having no corresponding part in the first embodiment are represented by numerals of double figures.

In FIG. 4 the booster is illustrated as being of the known closed-center type so that the system shown has an accumulator 60 communicated with the pump as shown by the solid line and including an air chamber and a liquid chamber separated by a suitable diaphragm and having the air chamber pressurized initially at some suitable level. The pump flow from the discharging port of the pump 405 is delivered through unloading valve 61 and check valve 62 to the inlet port 403 of the housing 402. Within the cylindrical bore of the housing, a power piston 407 is contained in close fitting slidable relationship of generally cylindrical shape having a large internal cylindrical recess 415 receiving one end of a restoring compressed spring 418, the other end of which is seated in the shoulder of the input piston 416 which is in turn received slidably in the recess 415. The input piston 416 also has a cylindrical recess 63 within which is slidably received a plunger 64. A compressed spring 65 bears at its one end against the plunger 64 and at the other end is seated in a ring partially embedded in a corresponding annular groove in the internal face of the recess 63 so that the plunger 64 is normally spring-baised toward abutment against the end of the recess 63. At the end of the recess 63, a bent passage 425 is connected to communicate the recess with the power chamber 408. The plunger 64 has a pair of separated annular grooves 66 and 67 in the external face and at the right-hand extremity a chipped off portion 68 to communicate the groove with the bent passage 425 of the input piston 416. The plunger 64 is provided with an axial and bent passage 69 which extends between the left end face and the land portion between the grooves 66 and 67. The input piston 416 has in the internal face of the bore 63 an annular recess or groove 70 and in the external face a pair of separated annular grooves 71 and 72, and a radial small drilled passage 73 and a diametrically larger drilled passage 74. The drilled passage 73 communicates the bore 63 with an internal annular groove 75 of the power piston 407 in the position shown. The other radial drilled passage 74 communicates the bore 63 with another annular groove 76 in the internal face of a wide annular groove 78 which is in communication via a radial drilled passage 77 with the internal cylindrical recess 415.

What has been thus far described is considered to be sufficient to structurally understand the embodiment under assistance of the representation using the same numerals as those of FIG. 1 in 400 series.

In the position shown the chamber or annular groove 78, radial passage 77, and the annular groove 71 are all in communication with the accumulator 60 and pressurized but no pressure differential is produced across the power piston 407, because of diametrical uniformity throughout the full length of the annular groove 78. The power piston is accordingly kept at rest as shown in FIG. 4. When the pedal is depressed by the driver, the input piston 416 moves to the left to reduce the interface A1 formed by the lands respectively neighboring the grooves 71 and 76, until the grooves communicate with each other and the opening B′ is closed. The pressure build-up the chamber 78 of the power piston 407 is, as a result, transmitted via radial drilled passage 77, annular grooves 71 and 76, chipped portion 68, and bent passage 425 into the power chamber 408. At this stage, the input piston 416 does not receive any reaction force because no fluid pressure is built in the reaction pressure chamber 417 which communicates via left half portion of the bore 63, bent passage 69, annular grooves 70 and 67, a radial drilled passage 73, annular groove 75 and inclined axial passage 423 with the drain chamber 409.

As above stated, the power chamber 408 is pressurized whereas the reactional chamber 417 is not pressurized. The piston 416 is moved by the operator without being resisted by any reactional force exerted on the piston 416. As a result, the input piston 416 is excessively moved to the left to thereby cause a higher rate of increase of pressure at an early stage of the operation. This is effective also to avoid timelag in exerting the required braking fluid pressure in the brake wheel cylinders.

When the increase in pressure in the power chamber 408 reaches a predetermined level, the plunger 64 moves further to the left, causing the grooves 70 and 67 to be blockaded from each other. The reaction chamber 417 is therefore altered from communication with the drain chamber into communication with the power chamber 408 through the small bent passage 69, grooves 66 and 70, and chipped portion 68. However, such alteration causes the pressure in the chamber 417 to be balanced with the pressure in chamber 408 under the assistance of the force of the compressed spring 65 and across the restriction by the opening formed by the two annular grooves 70 and 67. The reaction fluid pressure in chamber 417 is therefore kept in this stage at a predetermined lower level than that of the pressure in chamber 408 as viewed in FIG. 5.

From the foregoing, it will be understood that in the closed-center type of the booster, the invention is also enabled to attain an earlier building up of braking fluid pressure in the brake wheel cylinders of the vehicle than is attained by the known safety device which is prepared in the event of failure of powered fluid pressure in the booster.

What is claimed is:

1. A hydraulic brake booster for actuating an actuating piston in a master cylinder comprising:
   a cylinder, a power piston slidable within said cylinder and dividing the interior of said cylinder into a hydraulic fluid inlet chamber on one side of the power piston in open communication with a fluid source and a hydraulic fluid outlet chamber on the other side of the power piston in open communication with a fluid reservoir, the inlet and outlet chambers being normally in open fluid communication with each other,
   a manually actuable input piston means slidably received in part within said power piston and connected to a brake pedal,
   an output member extending from said power piston and adapted to be connected to the actuating piston in the brake master cylinder,
   a reaction chamber defined by a portion of said power piston and an acting face of said input piston and being normally in open fluid communication with said outlet chamber,
   means for establishing first and second fluid flow paths between said inlet chamber and said outlet chamber,
   a first fluid control means for restricting fluid flow from said inlet chamber to said outlet chamber through said first flow path in proportion to a magnitude of displacement of said input piston relative to said power piston during a first stage of said relative displacement to thereby exert a pressure differential between said inlet and outlet chambers,
   a second fluid control means for restricting fluid flow from said reaction chamber to said outlet chamber through a portion of said second flow path in proportion to a magnitude of displacement of said input piston relative to said power piston during a second stage of said relative displacement and with said first fluid flow path being substantially blocked, and
   a pressure transmitting control means positioned in the second fluid flow path between said inlet chamber and said reaction chamber such that pressure within said reaction chamber is maintained lower than that within said inlet chamber by a predetermined magnitude throughout said first stage and until said second fluid flow path becomes substantially blocked by said second fluid control means in said second stage to minimize the reaction force exerted against the brake pedal during said first stage and thereby promote rapid depressing thereof by an operator.

2. A hydraulic brake booster according to claim 1, wherein said pressure transmitting control means includes an orifice of restricted flow area for controlling fluid communication between said inlet and reaction chambers.

3. A hydraulic brake booster according to claim 1, wherein said pressure transmitting control means includes a valve normally spring-urged toward closed position and controlling fluid communication from said inlet chamber to said reaction chamber in the open position thereof.

4. A hydraulic brake booster according to claim 2, wherein two inlets are provided, the first inlet connecting said inlet chamber with a pressure source as well as a discharging port of a fluid pressure actuable device and the second inlet directly connected with a pressure source, and a normally closed valve means is provided to be opened in accordance with a larger distance movement of said input piston relative to said power piston so as to permit communication of said inlet chamber with the second inlet.

* * * * *